United States Patent
Di Pietro et al.

(10) Patent No.: US 10,218,727 B2
(45) Date of Patent: Feb. 26, 2019

(54) SANITY CHECK OF POTENTIAL LEARNED ANOMALIES

(71) Applicant: Cisco Technology, Inc., San Jose, CA (US)

(72) Inventors: Andrea Di Pietro, Lausanne (CH); Jean-Philippe Vasseur, Anchorage, AK (US)

(73) Assignee: Cisco Technology, Inc., San Jose, CA (US)

( * ) Notice: Subject to any disclaimer, the term of this patent is extended or adjusted under 35 U.S.C. 154(b) by 232 days.

(21) Appl. No.: 15/184,252

(22) Filed: Jun. 16, 2016

(65) Prior Publication Data

US 2017/0279832 A1 Sep. 28, 2017

Related U.S. Application Data

(60) Provisional application No. 62/312,834, filed on Mar. 24, 2016.

(51) Int. Cl.
*G06F 21/00* (2013.01)
*H04L 29/06* (2006.01)
*H04L 29/12* (2006.01)

(52) U.S. Cl.
CPC .......... *H04L 63/1425* (2013.01); *H04L 61/25* (2013.01); *H04L 63/0281* (2013.01); *H04L 63/1416* (2013.01); *H04L 63/1458* (2013.01); *H04L 63/1466* (2013.01)

(58) Field of Classification Search
CPC ............................ H04L 63/1425; H04L 61/25
USPC ................................................. 726/12, 22–25
See application file for complete search history.

(56) References Cited

U.S. PATENT DOCUMENTS

| | | | |
|---|---|---|---|
| 7,941,856 B2 | 5/2011 | Rubin et al. | |
| 9,171,155 B2 | 10/2015 | Romanenko et al. | |
| 2007/0233438 A1 | 10/2007 | Quimper et al. | |
| 2013/0254895 A1 | 9/2013 | Neil et al. | |
| 2014/0165207 A1* | 6/2014 | Engel | H04L 63/1425 726/25 |

OTHER PUBLICATIONS

Chatzigiannakis et al. "Data fusion algorithms for network anomaly detection: classification and evaluation" Third International Conference on Networking and Services(ICNS'07); The Computer Society; 2007; pp. 1-7.

* cited by examiner

*Primary Examiner* — Anthony D Brown
(74) *Attorney, Agent, or Firm* — Parker Ibrahim & Berg LLP; James M. Behmke; Stephen D. LeBarron

(57) ABSTRACT

In one embodiment, a device in a network receives, from a supervisory device, trace information for one or more traffic flows associated with a particular anomaly. The device remaps network addresses in the trace information to addresses of one or more nodes in the network based on roles of the one or more nodes. The device mixes, using the remapped network addresses, the trace information with traffic information regarding one or more observed traffic flows in the network, to form a set of mixed traffic information. The device analyzes the mixed traffic information using an anomaly detection model. The device provides an indication of a result of the analysis of the mixed traffic information to the supervisory device.

20 Claims, 13 Drawing Sheets

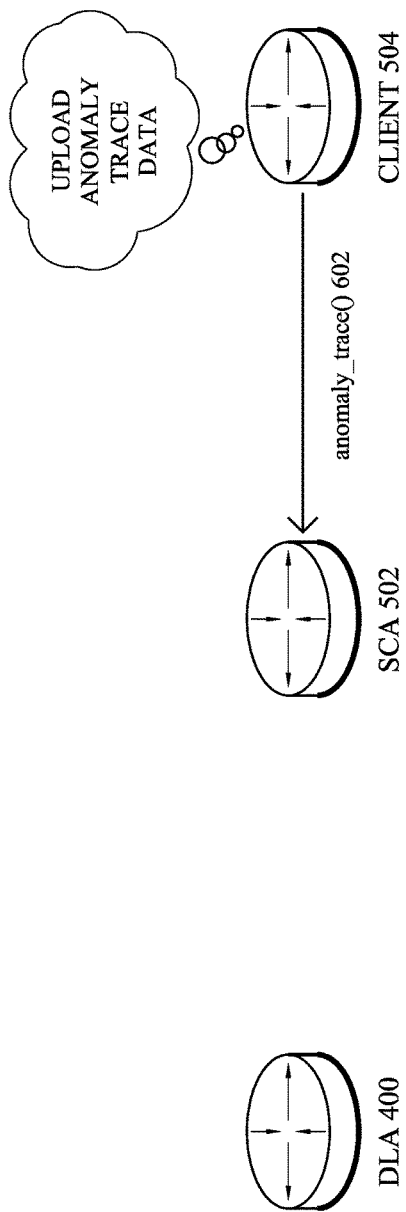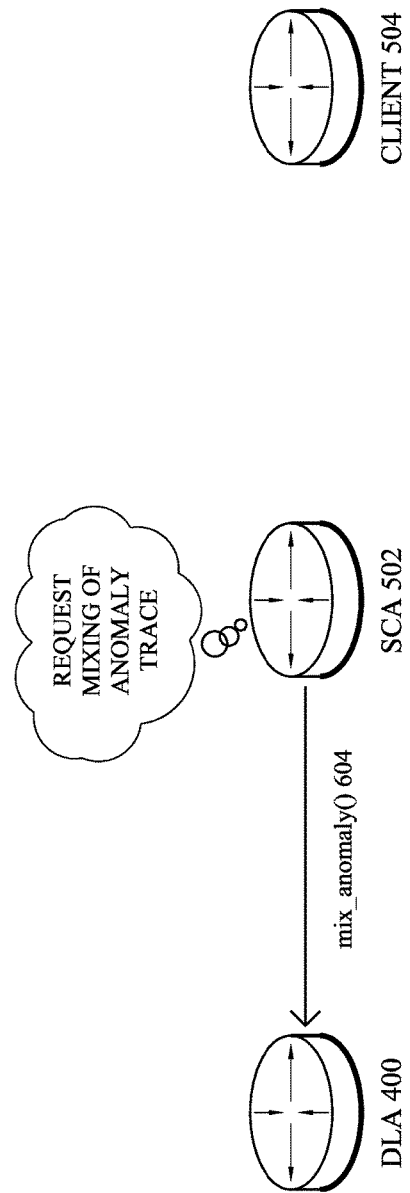

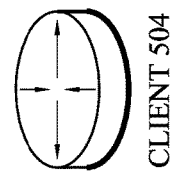
CLIENT 504
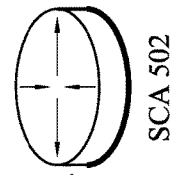
CLIENT 504
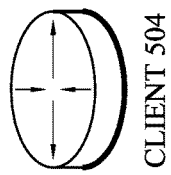
SCA 502
FIG. 6C
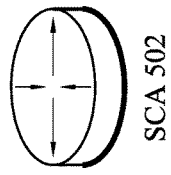
SCA 502
err_remapping() 606
FIG. 6D
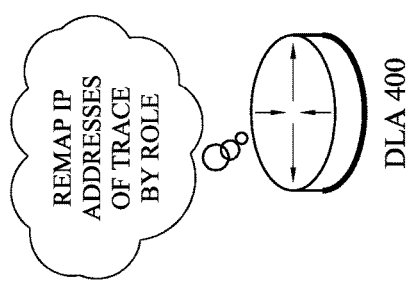
REMAP IP ADDRESSES OF TRACE BY ROLE
DLA 400
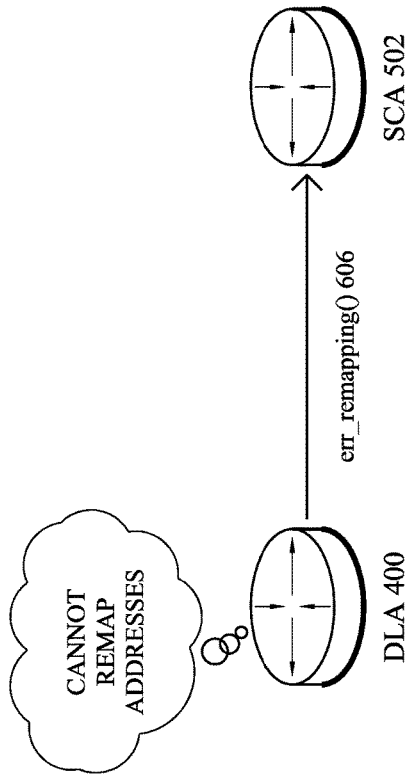
CANNOT REMAP ADDRESSES
DLA 400

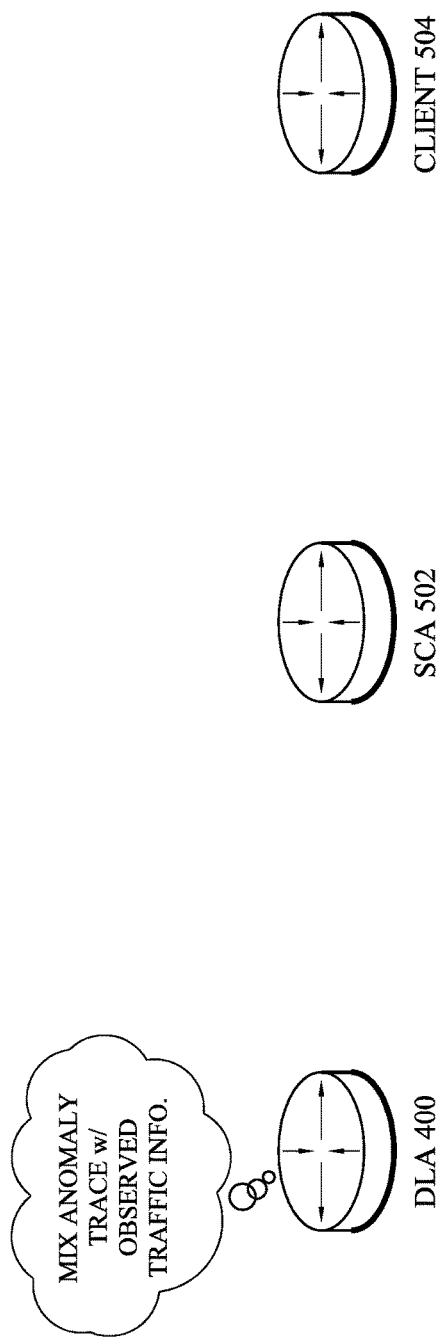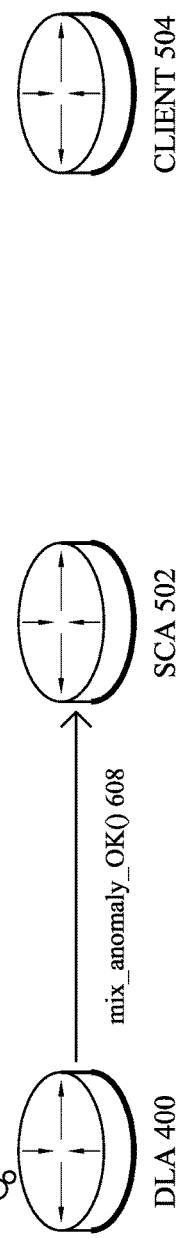

US 10,218,727 B2

SANITY CHECK OF POTENTIAL LEARNED ANOMALIES

RELATED APPLICATION

This application claims priority to U.S. Provisional Application No. 62/312,834, filed on Mar. 24, 2016, entitled SANITY CHECK OF POTENTIAL LEARNED ANOMALIES, by Di Pietro, et al., the contents of which are incorporated herein by reference.

TECHNICAL FIELD

The present disclosure relates generally to computer networks, and, more particularly, to a sanity check of potential learned anomalies.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

An anomaly detector represents one mechanism to detect botnet-related traffic and other anomalies in a network. However, many types of anomaly detectors are prone to learning anomalous patterns over time as they occur in the network.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 6A-6H illustrate examples of an anomaly detection model being verified;

DESCRIPTION OF EXAMPLE EMBODIMENTS

Overview

Figure 1A:
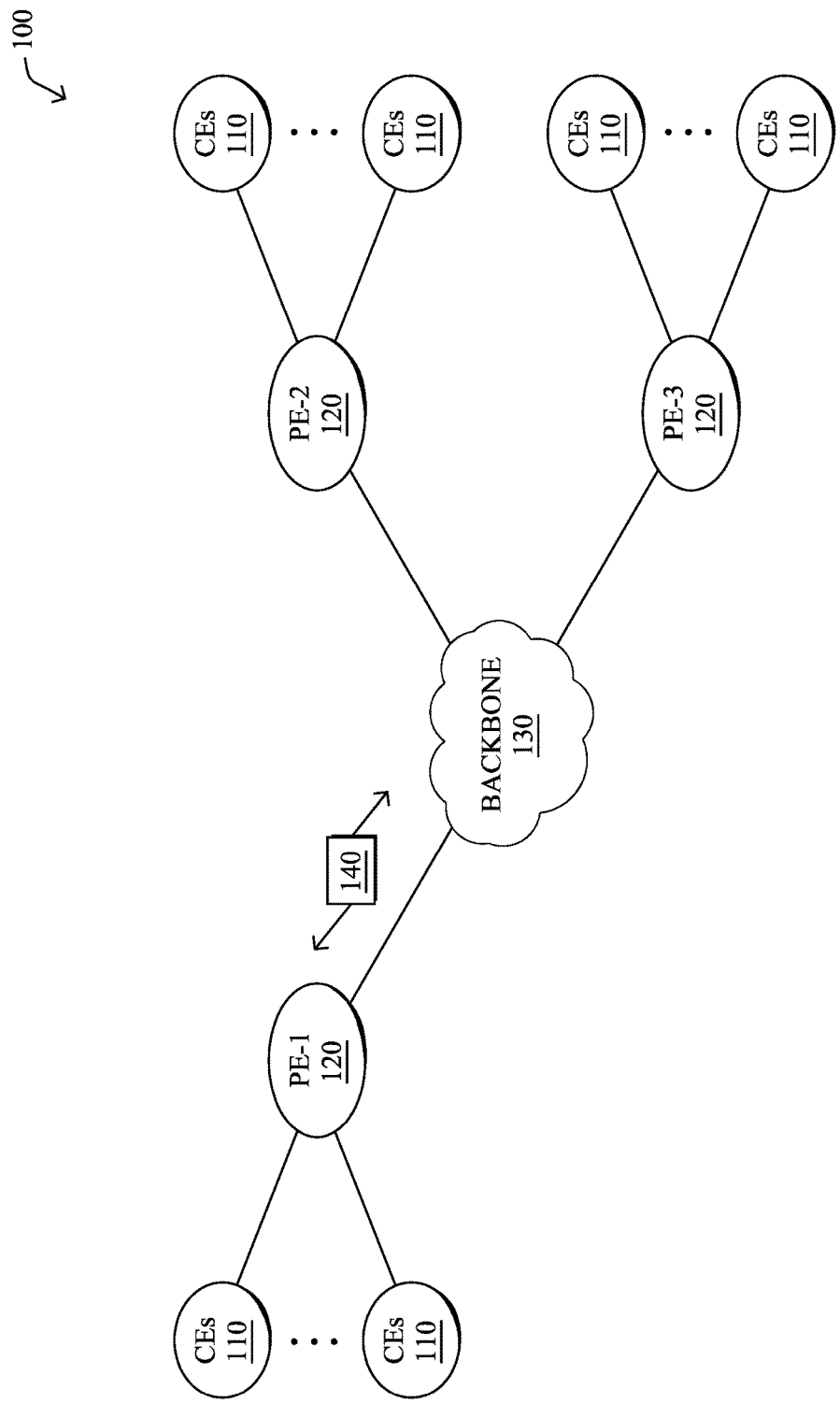
FIGS. 1A-1B illustrate an example communication network.

According to one or more embodiments of the disclosure, a device in a network receives, from a supervisory device, trace information for one or more traffic flows associated with a particular anomaly. The device remaps network addresses in the trace information to addresses of one or more nodes in the network based on roles of the one or more nodes. The device mixes, using the remapped network addresses, the trace information with traffic information regarding one or more observed traffic flows in the network, to form a set of mixed traffic information. The device analyzes the mixed traffic information using an anomaly detection model. The device provides an indication of a result of the analysis of the mixed traffic information to the supervisory device.

In further embodiments, a supervisory device in a network receives trace information for one or more traffic flows associated with an anomaly. The supervisory device provides, to a device hosting an anomaly detection model, the trace information for mixing with traffic information regarding one or more traffic flows observed by the device hosting the anomaly detection model. The supervisory device receives an indication of a result of the anomaly detection model analyzing mixed traffic information. The mixed traffic information comprises the trace information and the traffic information regarding the one or more traffic flows observed by the device hosting the model. The supervisory device validates whether the anomaly detection model was able to detect the anomaly based on the result of the anomaly detection model analyzing the mixed traffic information.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
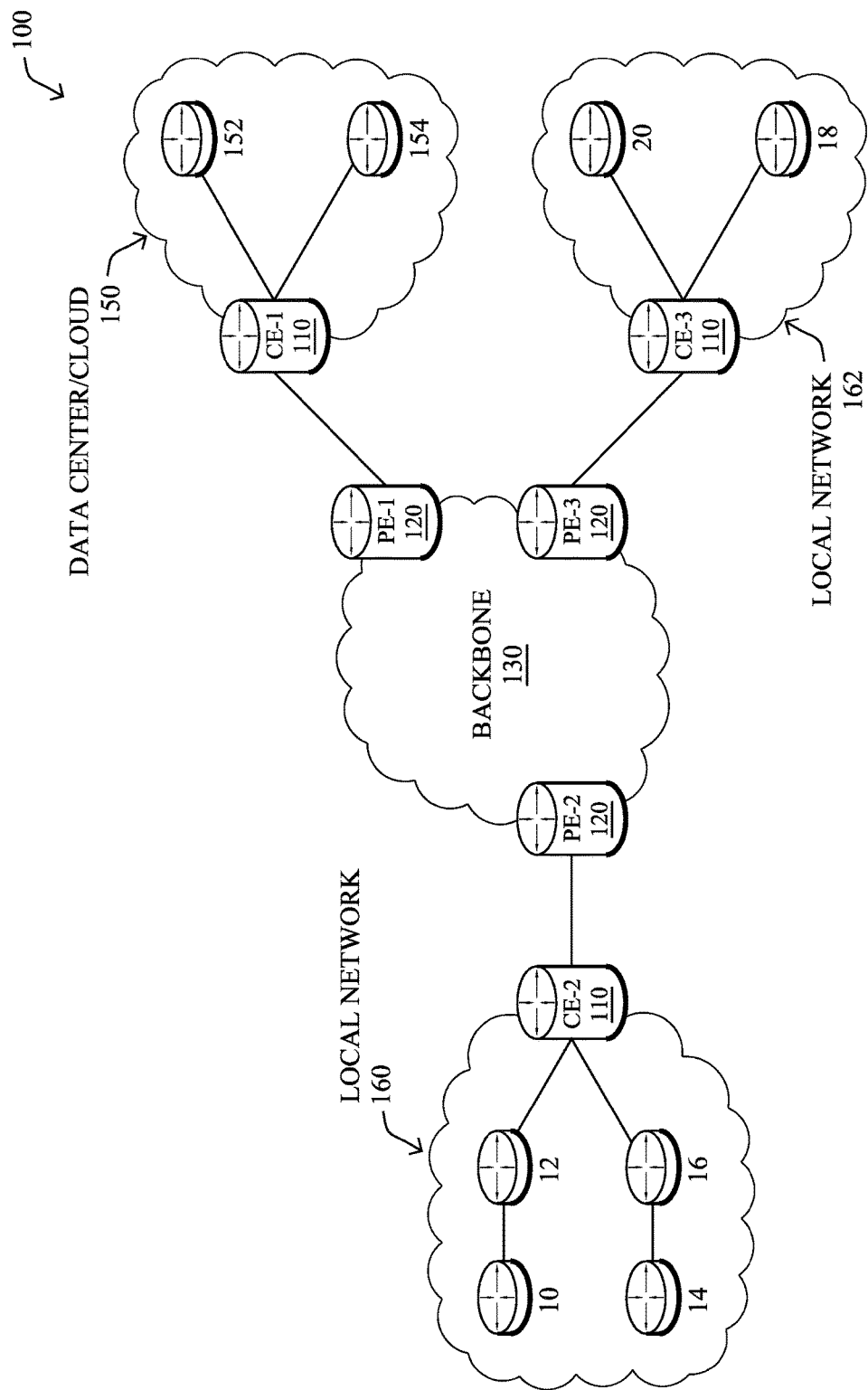

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such as the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
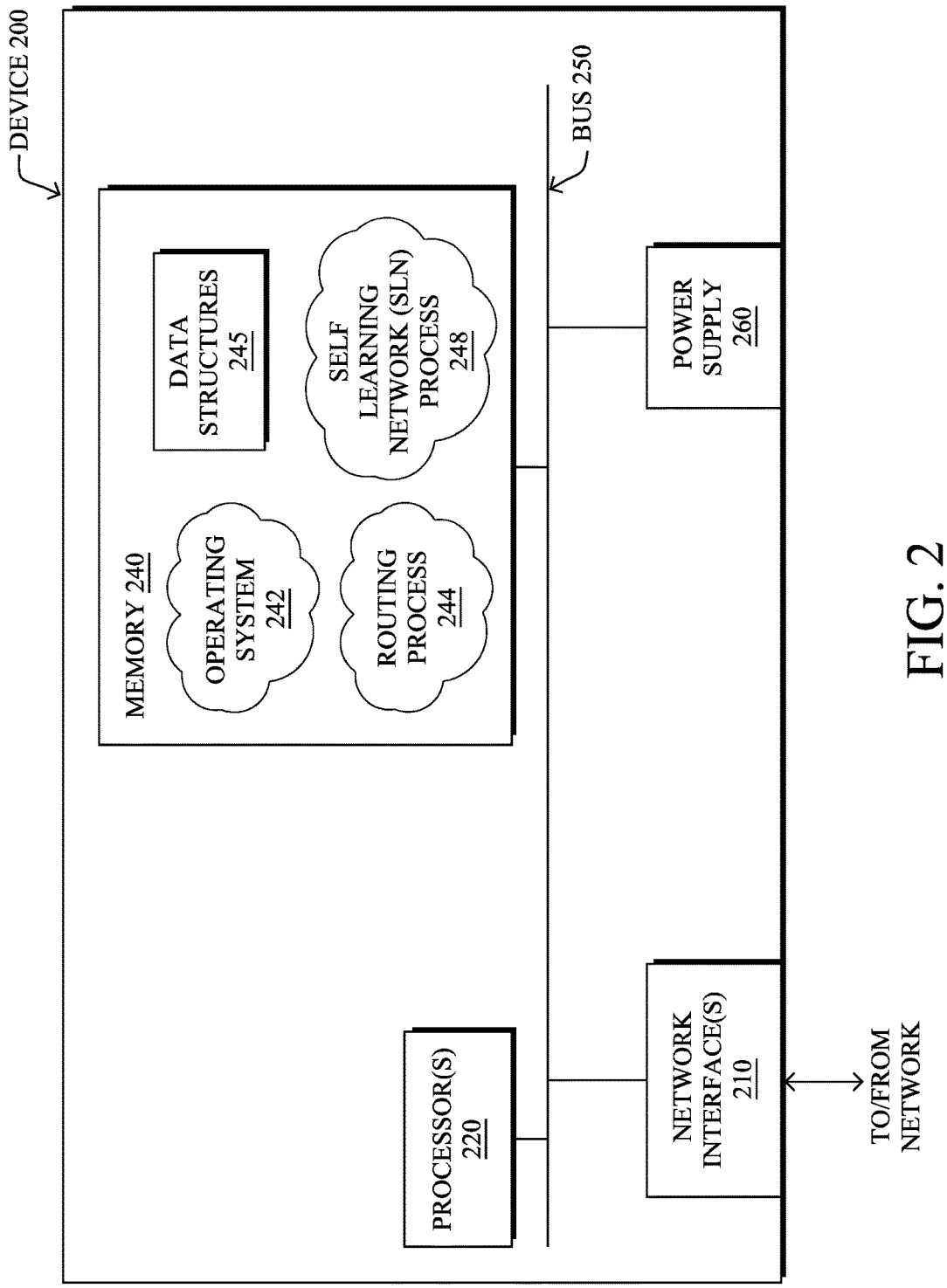
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a self learning network (SLN) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN"<draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

SLN process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs.

abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Machine learning processes may detect these types of anomalies using advanced approaches capable of modeling subtle changes or correlation between changes (e.g., unexpected behavior) in a highly dimensional space. Such anomalies are raised in order to detect, e.g., the presence of a 0-day malware, malware used to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used. SLN process 248 may detect malware based on the corresponding impact on traffic, host models, graph-based analysis, etc., when the malware attempts to connect to a C2 channel, attempts to move laterally, or exfiltrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, an SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured access control list (ACL), route redistribution policy, routing policy, QoS policy maps, or the like, may have dramatic consequences such a traffic black-hole, QoS degradation, etc. SLN process 248 may advantageously identify these forms of misconfigurations, in order to be detected and fixed.

In various embodiments, SLN process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DBSCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, SLN process 248 may also use graph-based models for purposes of anomaly detection. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

Figure 3:
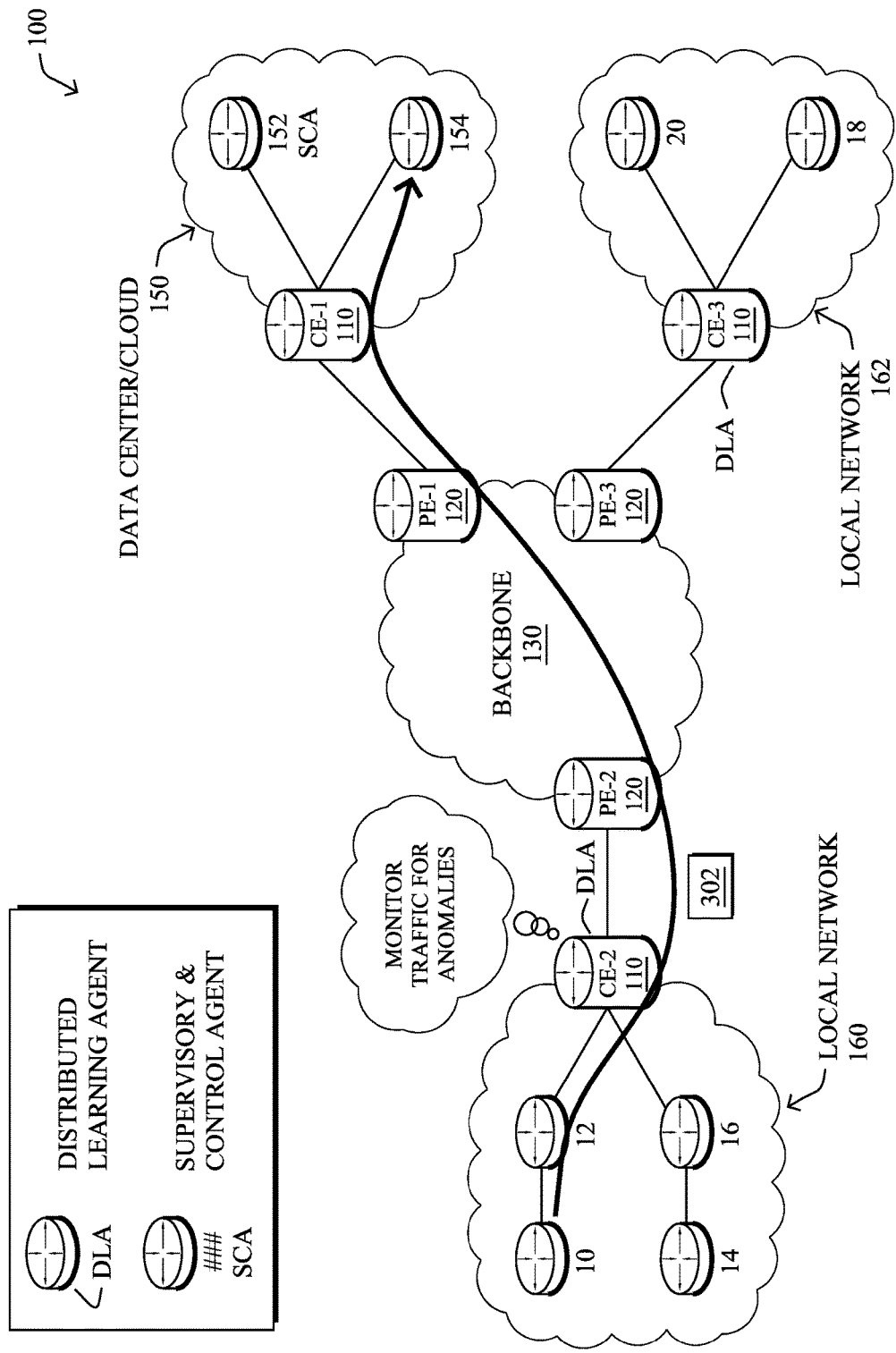
FIG. 3 illustrates an example self learning network (SLN) infrastructure.

An example self learning network (SLN) infrastructure that may be used to detect network anomalies is shown in FIG. 3, according to various embodiments. Generally, network devices may be configured to operate as part of an SLN infrastructure to detect, analyze, and/or mitigate network anomalies such as network attacks (e.g., by executing SLN process 248). Such an infrastructure may include certain network devices acting as distributed learning agents (DLAs) and one or more supervisory/centralized devices acting as a supervisory and control agent (SCA). A DLA may be operable to monitor network conditions (e.g., router states, traffic flows, etc.), perform anomaly detection on the monitored data using one or more machine learning models, report detected anomalies to the SCA, and/or perform local mitigation actions. Similarly, an SCA may be operable to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests (e.g., SYN flooding, sending an overwhelming number of requests to an HTTP server, etc.), to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

As shown in FIG. 3, routers CE-2 and CE-3 may be configured as DLAs and server 152 may be configured as an SCA, in one implementation. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SCA.

Assume, for purposes of illustration, that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154 (e.g., an application server, etc.). In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

In some cases, traffic 302 may be associated with a particular application supported by network 100. Such applications may include, but are not limited to, automation applications, control applications, voice applications, video applications, alert/notification applications (e.g., monitoring applications), communication applications, and the like. For example, traffic 302 may be email traffic, HTTP traffic, traffic associated with an enterprise resource planning (ERP) application, etc.

In various embodiments, the anomaly detection mechanisms in network 100 may use Internet Behavioral Analytics (IBA). In general, IBA refers to the use of advanced analytics coupled with networking technologies, to detect anomalies in the network. Although described later with greater details, the ability to model the behavior of a device (networking switch/router, host, etc.) will allow for the detection of malware, which is complementary to the use of a firewall that uses static signatures. Observing behavioral changes (e.g., a deviation from modeled behavior) thanks to aggregated flows records, deep packet inspection, etc., may allow detection of an anomaly such as an horizontal movement (e.g. propagation of a malware, etc.), or an attempt to perform information exfiltration.

Figure 4:
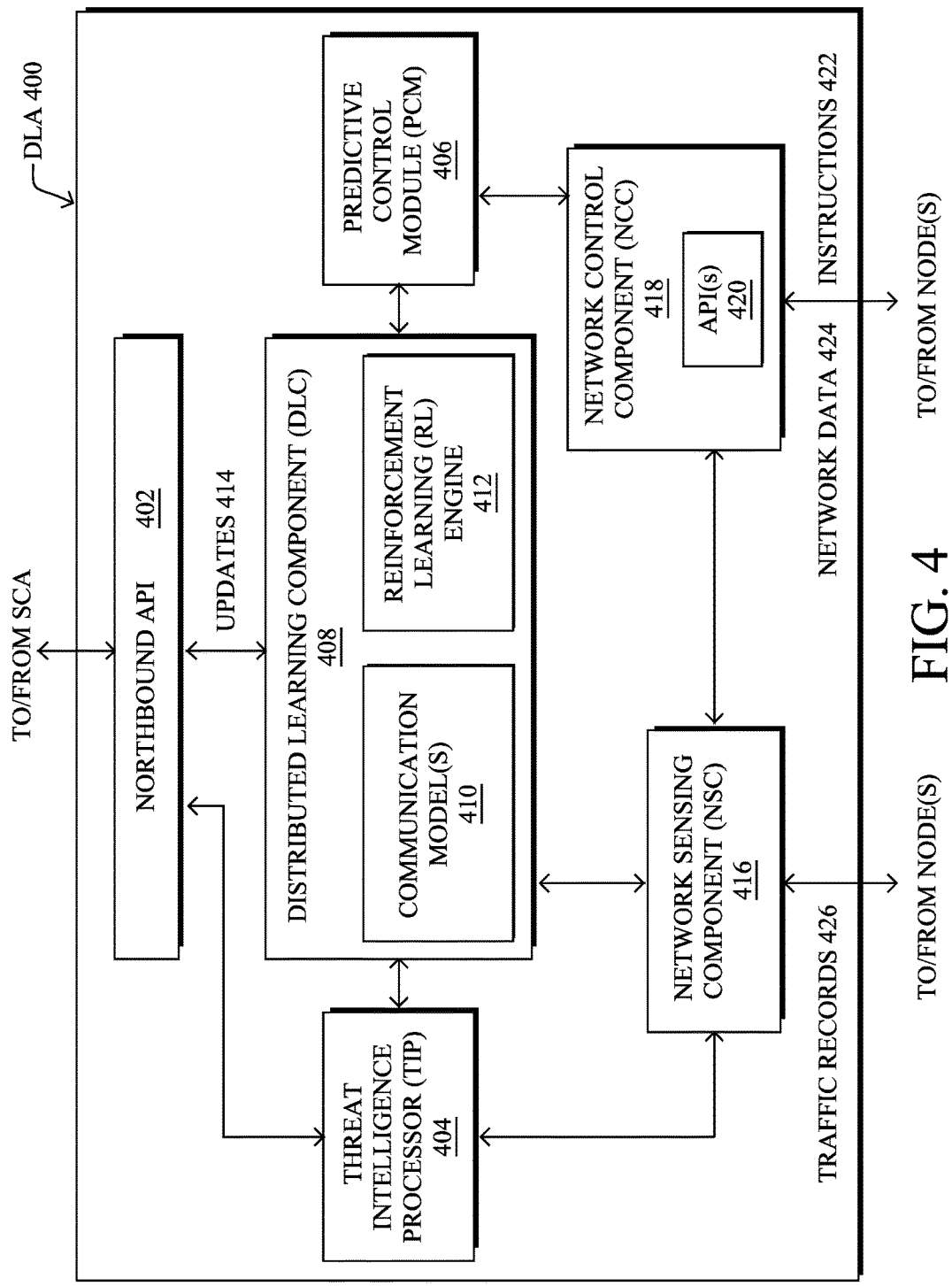
FIG. 4 illustrates an example distributed learning agent (DLA)

FIG. 4 illustrates an example distributed learning agent (DLA) 400 in greater detail, according to various embodiments. Generally, a DLA may comprise a series of modules hosting sophisticated tasks (e.g., as part of an overall SLN process 248). Generally, DLA 400 may communicate with an SCA (e.g., via one or more northbound APIs 402) and any number of nodes/devices in the portion of the network associated with DLA 400 (e.g., via APIs 420, etc.).

In some embodiments, DLA 400 may execute a Network Sensing Component (NSC) 416 that is a passive sensing construct used to collect a variety of traffic record inputs 426 from monitoring mechanisms deployed to the network nodes. For example, traffic record inputs 426 may include Cisco™ Netflow records or other traffic information, application identification information from a Cisco™ Network Based Application Recognition (NBAR) process or another application-recognition mechanism, administrative information from an administrative reporting tool (ART), local network state information service sets, media metrics, raw packets, or the like.

Furthermore, NSC 416 may be configured to dynamically employ Deep Packet Inspection (DPI), to enrich the mathematical models computed by DLA 400, a critical source of information to detect a number of anomalies. Also of note is that accessing control/data plane data may be of utmost importance, to detect a number of advanced threats such as data exfiltration. NSC 416 may be configured to perform data analysis and data enhancement (e.g., the addition of valuable information to the raw data through correlation of different information sources). Moreover, NSC 416 may compute various networking based metrics for use by the Distributed Learning Component (DLC) 408, such as a large number of statistics, some of which may not be directly interpretable by a human.

In some embodiments, DLA 400 may also include DLC 408 that may perform a number of key operations such as any or all of the following: computation of Self Organizing Learning Topologies (SOLT), computation of "features" (e.g., feature vectors), advanced machine learning processes, etc., which DLA 400 may use in combination to perform a specific set of tasks. In some cases, DLC 408 may include a reinforcement learning (RL) engine 412 that uses reinforcement learning to detect anomalies or otherwise assess the operating conditions of the network. Accordingly, RL engine 412 may maintain and/or use any number of communication models 410 that model, e.g., various flows of traffic in the network. In further embodiments, DLC 408 may use any other form of machine learning techniques, such as those described previously (e.g., supervised or unsupervised techniques, etc.). For example, in the context of SLN for security, DLC 408 may perform modeling of traffic and applications in the area of the network associated with DLA 400. DLC 408 can then use the resulting models 410 to detect graph-based and other forms of anomalies (e.g., by comparing the models with current network characteristics, such as traffic patterns. The SCA may also send updates 414 to DLC 408 to update model(s) 410 and/or RL engine 412 (e.g., based on information from other deployed DLAs, input from a user, etc.).

When present, RL engine 412 may enable a feed-back loop between the system and the end user, to automatically adapt the system decisions to the expectations of the user and raise anomalies that are of interest to the user (e.g., as received via a user interface of the SCA). In one embodiment, RL engine 412 may receive a signal from the user in the form of a numerical reward that represents for example the level of interest of the user related to a previously raised event. Consequently the agent may adapt its actions (e.g. search for new anomalies), to maximize its reward over time, thus adapting the system to the expectations of the user. More specifically, the user may optionally provide feedback thanks to a lightweight mechanism (e.g., 'like' or 'dislike') via the user interface.

In some cases, DLA 400 may include a threat intelligence processor (TIP) 404 that processes anomaly characteristics so as to further assess the relevancy of the anomaly (e.g. the applications involved in the anomaly, location, scores/degree of anomaly for a given model, nature of the flows, or the like). TIP 404 may also generate or otherwise leverage a machine learning-based model that computes a relevance index. Such a model may be used across the network to select/prioritize anomalies according to the relevancies.

DLA 400 may also execute a Predictive Control Module (PCM) 406 that triggers relevant actions in light of the events detected by DLC 408. In order words, PCM 406 is the decision maker, subject to policy. For example, PCM 406 may employ rules that control when DLA 400 is to send information to the SCA (e.g., alerts, predictions, recommended actions, trending data, etc.) and/or modify a network behavior itself. For example, PCM 406 may determine that a particular traffic flow should be blocked (e.g., based on the assessment of the flow by TIP 404 and DLC 408) and an alert sent to the SCA.

Network Control Component (NCC) 418 is a module configured to trigger any of the actions determined by PCM 406 in the network nodes associated with DLA 400. In various embodiments, NCC 418 may communicate the corresponding instructions 422 to the network nodes using APIs 420 (e.g., DQoS interfaces, ABR interfaces, DCAC interfaces, etc.). For example, NCC 418 may send mitigation instructions 422 to one or more nodes that instruct the receives to reroute certain anomalous traffic, perform traffic shaping, drop or otherwise "black hole" the traffic, or take other mitigation steps. In some embodiments, NCC 418 may also be configured to cause redirection of the traffic to a "honeypot" device for forensic analysis. Such actions may be user-controlled, in some cases, through the use of policy maps and other configurations. Note that NCC 418 may be accessible via a very flexible interface allowing a coordinated set of sophisticated actions. In further embodiments, API(s) 420 of NCC 418 may also gather/receive certain network data 424 from the deployed nodes such as Cisco™ OnePK information or the like.

The various components of DLA 400 may be executed within a container, in some embodiments, that receives the various data records and other information directly from the host router or other networking device. Doing so prevents these records from consuming additional bandwidth in the external network. This is a major advantage of such a distributed system over centralized approaches that require sending large amount of traffic records. Furthermore, the above mechanisms afford DLA 400 additional insight into other information such as control plane packet and local network states that are only available on premise. Note also that the components shown in FIG. 4 may have a low footprint, both in terms of memory and CPU. More specifically, DLA 400 may use lightweight techniques to compute features, identify and classify observation data, and perform other functions locally without significantly impacting the functions of the host router or other networking device.

As noted above, certain anomaly detectors do not require a priori information on what is considered malicious and what is considered benign. Notably, these detectors may simply learn what the normal baseline looks like and detect any behavior which is too distant from their computed normal traffic model. This allows the detectors to adapt automatically to the dynamics of the traffic observed from a particular vantage point. However, these types of anomaly detection approaches are not without risk. In particular, it may be possible for behaviors which should be considered as anomalies to be incorporated into the baseline traffic model. For example, this can happen under a number of different conditions:

- The anomaly happens during the initial system learning period (e.g., right after the system has been deployed, when the detector is building its initial baseline model and is not able yet to raise anomalies).
- The anomaly is initially subtle enough to avoid detection and gets slowly absorbed by the anomaly detection model. For example, an attacker may perform a network scan at a very low rate, so that the scanning behavior is not anomalous enough to be detected and will be absorbed into the baseline traffic model of the anomaly detector.
- The anomaly is tagged as normal behavior because of a human mistake. Indeed, some systems allow a user to give feedback on a detected anomaly so that the system will avoid raising it again (e.g., if the user indicates that the anomaly is a false positive). If, by mistake, the user instructs the system to filter a behavior which is actually anomalous, this may prevent the anomaly detector from detecting subsequent anomalies of a similar type.

—Sanity Check of Potential Learned Anomalies—

The techniques herein allow for the probing of a running anomaly detection system by mixing samples of known anomalies into its observed traffic, thus revealing whether behaviors that are expected to be detected have become part of the modeled baseline. Said differently, the techniques herein verify that the current anomaly detection model of a particular sensor is still able to detect a set of target anomalies (e.g., that an anomalous behavior has not been learned as normal behavior). The mechanisms involve mixing datasets of actual anomalous activity with the traffic observed by the sensor (e.g., a DLA, etc.) and verifying whether the anomaly detection model correctly detects the anomaly. In case of a missed detection, the system may report the issue to a user who can decide to invalidate the model and force the sensor to rebuild it.

Illustratively, the techniques described herein may be performed by hardware, software, and/or firmware, such as in accordance with the SLN process 248, which may include computer executable instructions executed by the processor 220 (or independent processor of interfaces 210) to perform functions relating to the techniques described herein, e.g., in conjunction with routing process 244.

Specifically, in various embodiments, a device in a network receives, from a supervisory device, trace information for one or more traffic flows associated with a particular anomaly. The device remaps network addresses in the trace information to addresses of one or more nodes in the network based on roles of the one or more nodes. The device mixes, using the remapped network addresses, the trace information with traffic information regarding one or more observed traffic flows in the network, to form a set of mixed traffic information. The device analyzes the mixed traffic information using an anomaly detection model. The device provides an indication of a result of the analysis of the mixed traffic information to the supervisory device.

Figure 5:
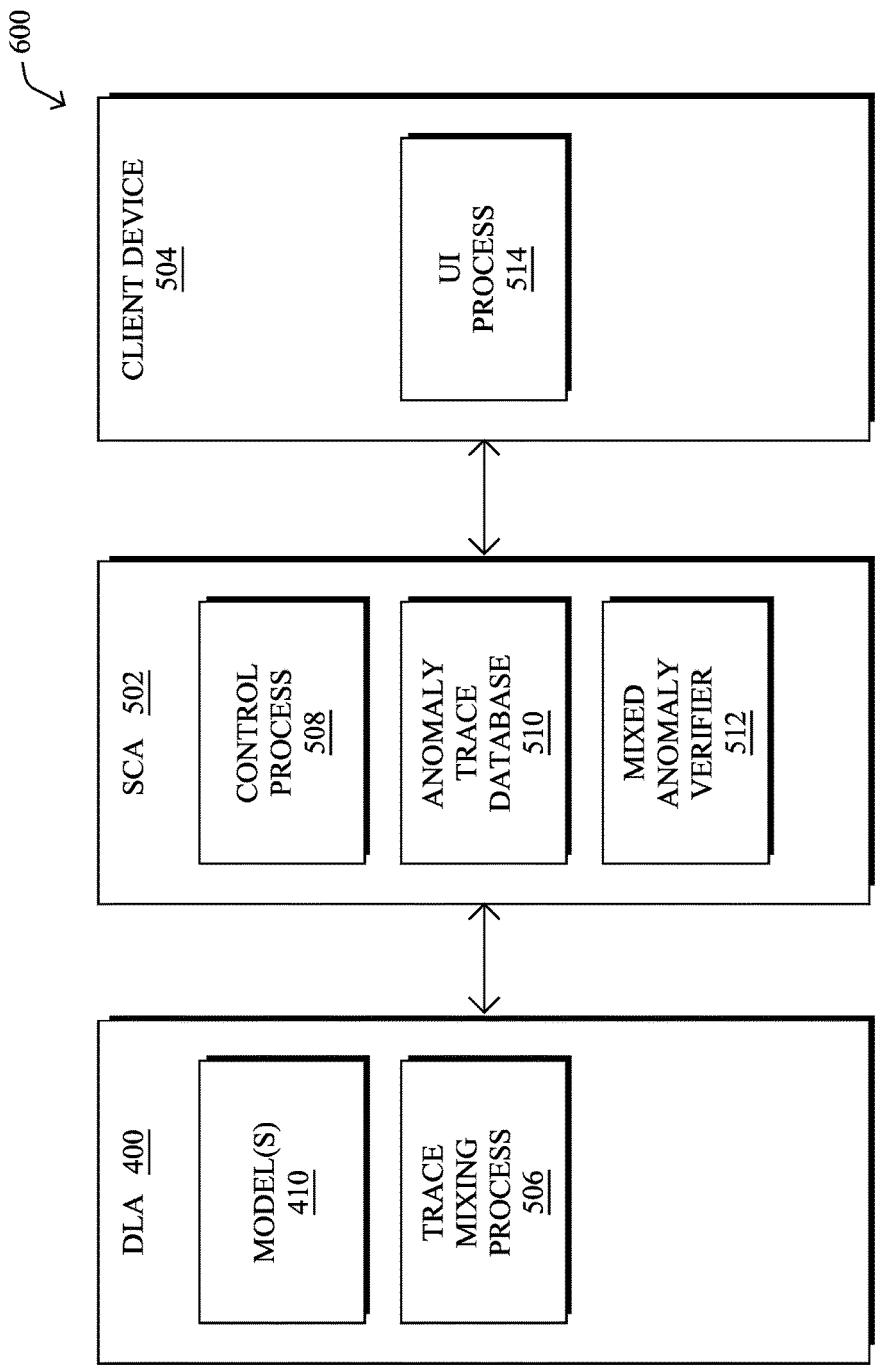
FIG. 5 illustrates an example architecture for sanity checking an anomaly detection model.

Operationally, FIG. 5 illustrates an example system architecture 500 for sanity checking an anomaly detection model, according to various embodiments. As shown, architecture 500 may include a DLA 400, an SCA 502, and potentially a client device 504 in communication therewith.

As described above, SCA 502 may execute a control process 510 that provides supervisory control over DLA 400 and receives notifications of any anomalies detected by DLA 400. For example, control process 508 may receive administrative commands and/or parameters from a user interface (UI) process 514 executed by client device 504 or directly on SCA 502. Notably, control process 508 may generate visualizations for display by UI process 514, thereby allowing an administrator or other user to review the anomaly detection mechanisms in the network. In response, the user may provide feedback regarding any detected anomalies to DLA 400 via control process 508.

Also as described above, DLA 400 may generate and use any number of behavioral analytics models 410, to detect anomalous conditions in the network. These models may be based on any number of sets of sample data regarding the operation of the network (e.g., characteristics of the observed traffic flows in the network, metrics derived therefrom, etc.). In other words, a given model 410 may use a training set of n-number of prior sets of samples, to determine whether the next set of sample data represents an anomaly in the network. For example, a statistical model may evaluate the probability of an observed event occurring in the network, given the training set of prior observations regarding the network.

In various embodiments, SCA 502 may maintain an anomaly trace database 510 that stores trace information describing well known anomalies that architecture 500 is expected to detect. Such trace information may include, but is not limited to, raw packets, flow-level reports, higher level statistics, etc., for the traffic flows associated with the anomalies. As detailed below, SCA 502 may use anomaly trace database 510, to test whether the anomaly detection model(s) 410 hosted by DLA 400 are still able to detect a particular, known anomaly. In turn, in some embodiments, DLA 400 may execute a trace mixing process 506 configured to mix anomaly trace information from SCA 502 with observed traffic information in the local network of DLA 400. For example, trace mixing process 506 may be a component of NSC 416, or operate in conjunction therewith, to incorporate the anomaly trace information with traffic information sensed from the network analyzed by model(s) 410. Additionally, in some embodiments, SCA 502 may execute a mixed anomaly verifier that determines whether model(s) 410 were able to detect a particular anomaly when analyzing the mixed traffic information.

Figure 6G:
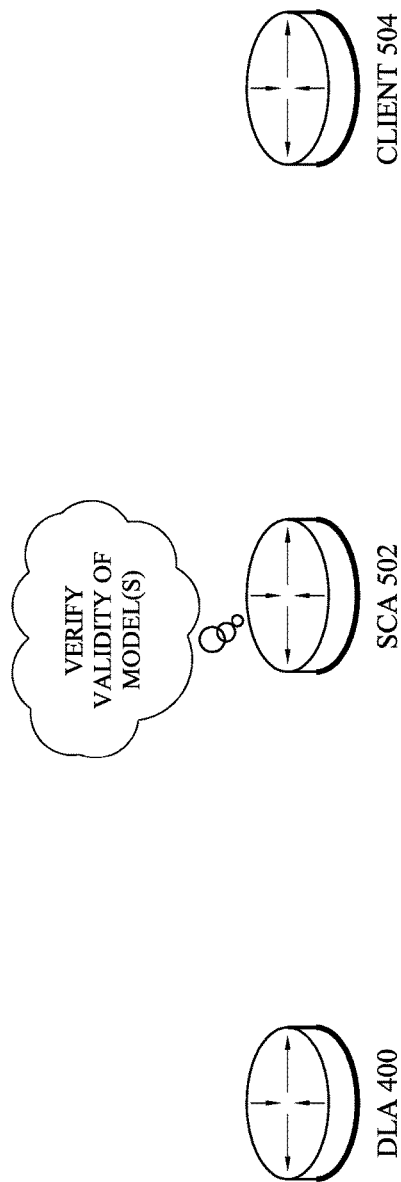

FIGS. 6A-6H illustrate examples of an anomaly detection model being verified, according to various embodiments. As shown in FIG. 6A, SCA 502 may maintain a database of trace information for a set of known anomalies (e.g., database 510). In some cases, the database of known anomalies can be uploaded manually to SCA 502. For example, an administrator may upload anomaly trace information to SCA 502 by sending an anomaly_trace( ) message 602 from client device 504 to SCA 502. In other cases, SCA 502 may receive the anomaly trace information from other networking devices in the network, such as a firewall, intrusion prevision system, or the like.

In FIG. 6B, SCA 502 may be in charge of triggering/activating model verification across any or all of the DLAs (e.g., sensors) managed by SCA 502. For example, SCA 502 may send a mix_anomaly( ) message 604 to DLA 400, to initiate validation of the anomaly detection model(s) hosted by DLA 400. Notably, message 604 may active a traffic mixing mechanism (e.g., traffic mixing process 506) hosted by DLA 400, to intermix anomalous trace information with actual traffic information observed in the local network of DLA 400.

In some embodiments, message 604 may include a raw trace of records representing an anomaly and a set of time(s) that DLA 400 should mix the trace records with the observed traffic. Further, message 604 may include a tag to uniquely identify the tested anomaly.

In some cases, depending on the particular semantic of the anomaly, just including raw records in message 604 may not be enough to validate the anomaly detection model(s). Notably, an anomaly detection system may keep some states about the IP addresses monitored by the system. Therefore, the anomalous traffic takes on a particular significance, depending on the specific addressees involved in the anomaly. For example, a DNS server receiving a large number of DNS-related traffic flows may not be anomalous, but the same cannot be said for a common workstation receiving a high volume of DNS-related traffic. As a consequence, in order for an anomaly to be significant, it is sometimes necessary to consider the addresses and roles of the nodes involved in the anomaly and in the local network of the DLA undergoing testing.

In one embodiment, message 604 may include a remapping directory which associates each of the IP addresses in the enclosed anomalous records to a particular role. For example, if the records represent a DNS-based data exfiltration, the directory will specify that address X in the original record (e.g., corresponding to the DNS server in the original anomaly) will need to be remapped to a local IP address of a node with a DNS-server profile. Notice that the semantic used for specifying roles will strictly depend on the type of state that the sensor/DLA keeps about its monitored addresses. Such additional context may not be required for specific anomalies such as a DDoS attack that does not have influence on other normal traffic (e.g., SYN flood, Slow Loris, etc.).

As shown in FIG. 6C, if message 604 from SCA 502 includes a remapping directory, DLA 400 may remap the indicated addresses to local addresses of nodes observed by DLA 400, according to their various roles. For example, DLA 400 may first search through its internal state for IP addresses which are suitable for each role indicated in message 604. In turn, DLA 400 may remap the addresses in the anomaly trace information to those of nodes in the local network monitored by DLA 400. As part of the remapping, DLA 400 may further adjust any timestamps in the trace information, to determine when the simulated flows associated with the anomaly are to be mixed in with the actual, observed traffic. This allows the anomaly to be treated as if the anomaly were happening in real time, as opposed to being part of a historical trace capture.

In FIG. 6D, if DLA 400 is unable to find a suitable IP address for a particular role indicated in message 604, DLA 400 may send an err_remapping( ) message 606 back to SCA 502. For example, assume that the address directory in message 604 includes the address of a particular DNS server, but DLA 400 is unable to identify a DNS server in its monitored network. In such a case, DLA 400 may notify SCA 502 that it could not complete the address mapping.

In FIG. 6E, DLA 400 may mix the trace information for the anomalous traffic flows from message 604 with observed traffic information regarding traffic flows in the local network of DLA 400. For example, DLA 400 may simulate the particular anomaly by treating the trace information as having been observed in the local network of DLA 400, using the remapped addresses. Thus, DLA 400 may feed the trace information to its local anomaly detection model(s), in conjunction with information regarding actual traffic flows observed in the local network of DLA 400. Optionally, DLA 400 may also tag the records which are associated with the anomaly, so as to distinguish them from the actual observed traffic.

In FIG. 6F, DLA 400 may provide information to SCA 502 regarding the "replayed" anomaly via a mix_anomaly_ok( ) message 608. Message 608 may include, for example, any or all of the following:

The details of the replayed anomaly (e.g., the IP addresses used during remapping, timing information regarding when the anomaly mixing began or ended, etc.); and/or Any debugging information about the dynamics of the anomaly detection system during the anomaly period (e.g. logs of the anomaly detection process).

Note that message 608 may not convey any information about the actual detection results to SCA 502, in some embodiments. For example, DLA 400 may use its existing anomaly reporting mechanisms, to report any detected anomaly to SCA 502 from the test. The system can identify an anomaly as being caused by mixed traffic by associating it to the anomaly tag (which has been used previously, to mark the mixed records).

In some cases, mixing the anomalous traffic into the actual traffic may cause the anomaly itself to be included in the baseline anomaly detection model. In other words, the trace information for the anomaly may cause the model under test to begin treating the anomaly as normal. Thus, in some embodiments, DLA 400 may prevent its own anomaly detection model(s) from being updated during the anomaly mixing period.

In another embodiment, DLA 400 may flag the records which stem from the traffic mixing before analyzing the mixed traffic information with the anomaly detection model. This allows, in turn, DLA 400 to flag any resulting anomaly alerts that are raised as a result of the traffic mixing and not actual network events. DLA 400 may then include this information in the anomaly context sent to SCA 502 via message 608 and/or during reporting of the detected anomaly.

Figure 6H:
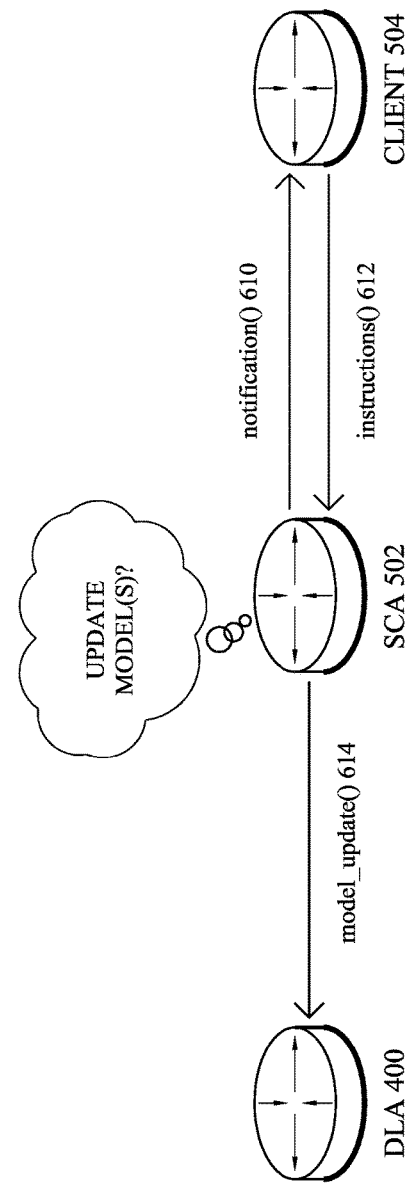

In FIG. 6H, SCA 502 may operate to verify whether DLA 400 was able to detect the anomaly from the mixed traffic information. For example, mixed anomaly verifier 512 of SCA 502 may leverage any or all of its a priori information about the anomaly such as:

The original records of the anomaly as stored in anomaly trace database 510; and The contextual information reported by mix_anomaly_ok( ) message 608 received from DLA 400.

Based on such information, SCA 502 may compute an expected detection result for the mixed anomaly. In turn, SCA 502 may compare this result with the anomalies reported by DLA 400 within the time range specified in the mix_anomaly_ok message 608 received from DLA 400. By comparing the expected detection results against the reported anomalies, SCA 502 is able to verify whether the anomaly detection model(s) of DLA 400 were actually able to detect the anomaly.

SCA 502 may use different matching criteria between the expected and detected anomalies, depending on the kind of contextual information that the system provides and on the level of inaccuracy that is considered acceptable. For example, if the system provides a list of all of the flows involved in an anomaly, SCA 502 can deem that the mixed anomaly has been detected if DLA 400 raised an anomaly whose flow list includes at least 80% of the flows of the original anomaly. Such a mapping may require SCA 502 to apply the same IP address mapping used by DLA 400 during the traffic mixing. In another example, if DLA 400 only reports the IP addresses involved in the anomaly and the type of traffic, SCA 502 may deem there to be a match if it pinpoints all of the IP addresses involved in the mixed anomaly and if the reported traffic type is consistent with the original anomaly.

Whatever the adopted matching criteria, if SCA 502 has detected a matching anomaly, SCA 502 may determine that the model of the probed DLA 400 is still valid. In such a case, SCA 502 may hide the detected anomaly from the user, as it does not represent an actual event of interest in the network, and may schedule further probing of DLA 400 at a later time. Notably, if anomalies raised by DLA 400 as a result of the traffic mixing carry their original anomaly tag, SCA 502 may hide the anomalies from the user, even in the case of not matching the expected result. For example, if DLA 400 only reports one of the original IP addresses as anomalous (e.g., based on the remapping), SCA 502 may decide that the detection has failed and still prevent the anomaly from being reported as an actual anomaly.

In FIG. 6H, if SCA 502 determines that DLA 400 did not correctly identify the mixed-in anomaly, SCA 502 may alert a user. For example, SCA 502 may send a notification( ) message 610 to client device 504, that alerts the user to the fact that the model of DLA 400 is not functioning properly. Optionally, message 610 may also include the debug information carried by the mix_anomaly_ok( ) message 608 from DLA 400. The user of client device 504 can then decide to reset such a model and restart the learning phase of the involved sensor. For example, client device 504 may send instructions( ) message 612 to SCA 502 to initiate an update to the anomaly detection model(s) of DLA 400. In turn, SCA 502 may send a model_update( ) request message 614 to DLA 400 that causes DLA 400 to retrain or update its model(s).

Another aspect of the techniques herein is used to assess a potential overall lack of detection efficacy for a known anomaly across all DLAs managed by SCA 502. Indeed, it may be very useful for a given anomaly of type A to process the efficacy results of anomaly detection across a set of DLAs, in light of the traffic to which the DLAs are exposed. For example, SCA 502 may determine that all DLAs exposed to a specific traffic type are equipped with anomaly detectors that can no longer detect the anomaly of type A. SCA 502 can then use such information to either tune the anomaly detectors at these locations or employ different machine learning-based techniques for the given anomaly at the DLAs. Alternative, as noted, SCA 502 may simply request the DLAs to relearn a new model.

Figure 7:
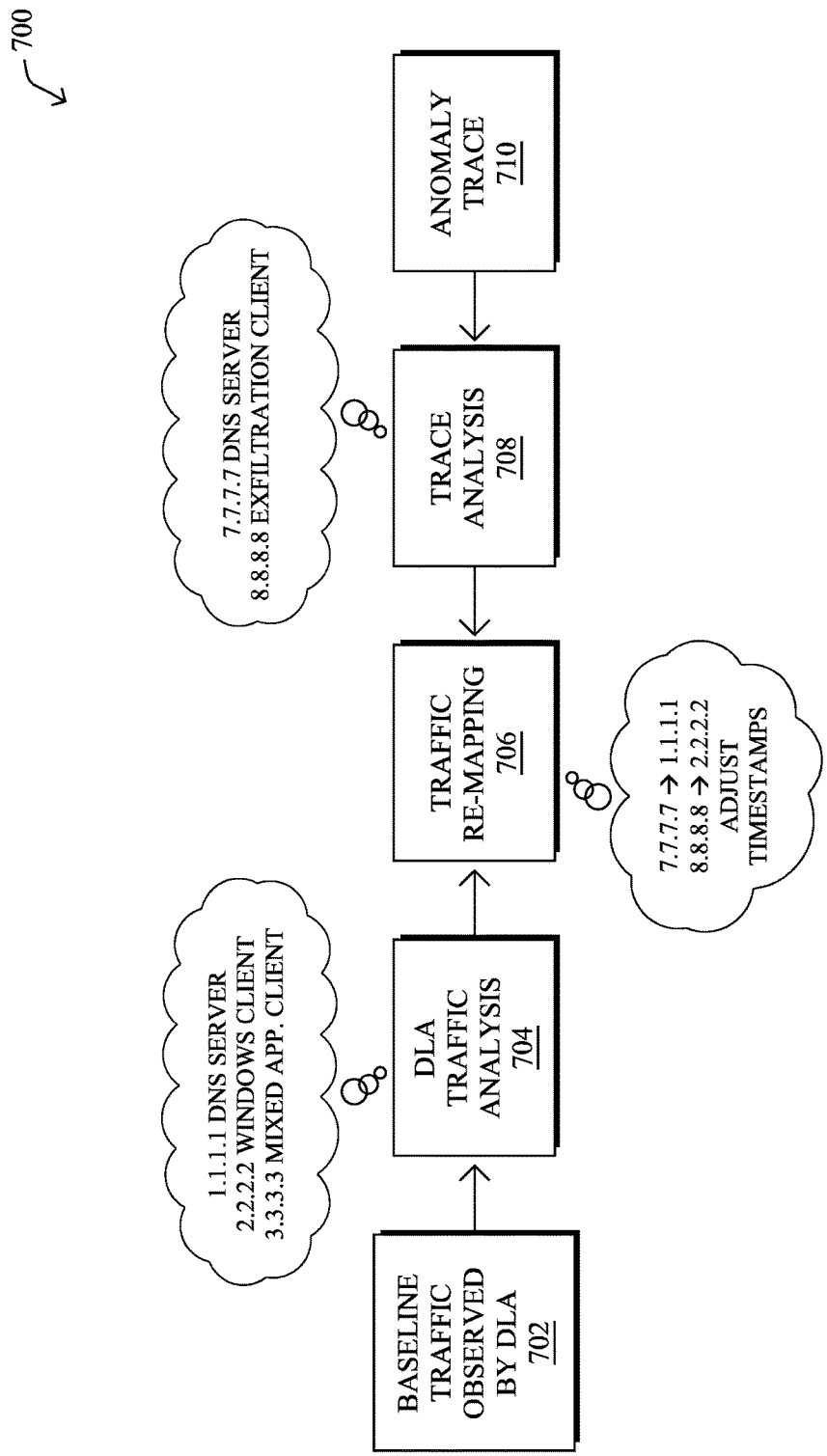
FIG. 7 illustrates an example of address mapping.

FIG. 7 illustrates an example of address mapping, in accordance with various techniques herein. As shown in illustration 700, there are three primary sets of input data: the baseline anomaly trace information 710, the baseline traces 702 observed for the local network of the DLA, and a categorization of the roles of the nodes involved in the traces. This categorization may be provided by leveraging contextual information regarding the flows (e.g., information regarding the clients, servers, applications, etc. of the flows). As shown in block 708, the techniques may analyze the traffic matrix of the original anomaly trace information 710, to identify the roles associated with the addresses in the trace. Roles may include, for example, indications of the various types of servers (e.g., DNS, FTP, webpage, etc.) and/or clients involved in the traffic flows. For example, based on the traffic analysis of anomaly trace information 710, the system may determine that the anomaly involves a DNS server with address 7.7.7.7 and a data exfiltration client with address 8.8.8.8. In some embodiments, the DLA may confirm that those addresses have been observed for a large enough amount of time before the anomaly is inserted. As a result, the system may generate a file reporting the identified addresses with their corresponding roles.

The DLA receiving the anomaly trace information may perform a similar assessment, to determine whether any of its local addresses perform similar roles in its local network. For example, at block 704, the DLA may analyze its own baseline traffic 702, to determine the roles and addresses of the nodes in its observed network. For purposes of illustration, assume that this results in the DLA mapping address 1.1.1.1 to the role of a DNS server, address 2.2.2.2 to the role of a Windows-based client, and address 3.3.3.3 to the role of a mixed application client.

At block 706, the DLA may perform a remapping of the addresses in the anomaly trace information to local addresses in the network observed by the DLA. For example, since address 7.7.7.7 in the anomaly trace information is associated with a DNS server, the DLA may remap this address to be 1.1.1.1, which is the address of a local DNS server under observation of the DLA. Similarly, the DLA may remap the address of the exfiltration client to any of the different kinds of clients in the baseline traffic 702 of the DLA, in order to explore the possible attack space. For example, the DLA may remap the address of the exfiltration client, 8.8.8.8, to be that of the Windows-based client with address 2.2.2.2. Also, the DLA may shift any timestamps in anomaly trace information, to fall within the same time period of the baseline 702. The remapped trace is then analyzed to create a ground truth file, which can be used to check a posteriori the output of the anomaly detection model(s) (e.g., the output of DLC 408). In turn, the DLA may mix the remapped anomaly trace information 710 with that of the baseline information 702 observed by the DLA as a uniform input to the model(s), whereby events from the two traces are simply interleaved by timestamps.

Figure 8:
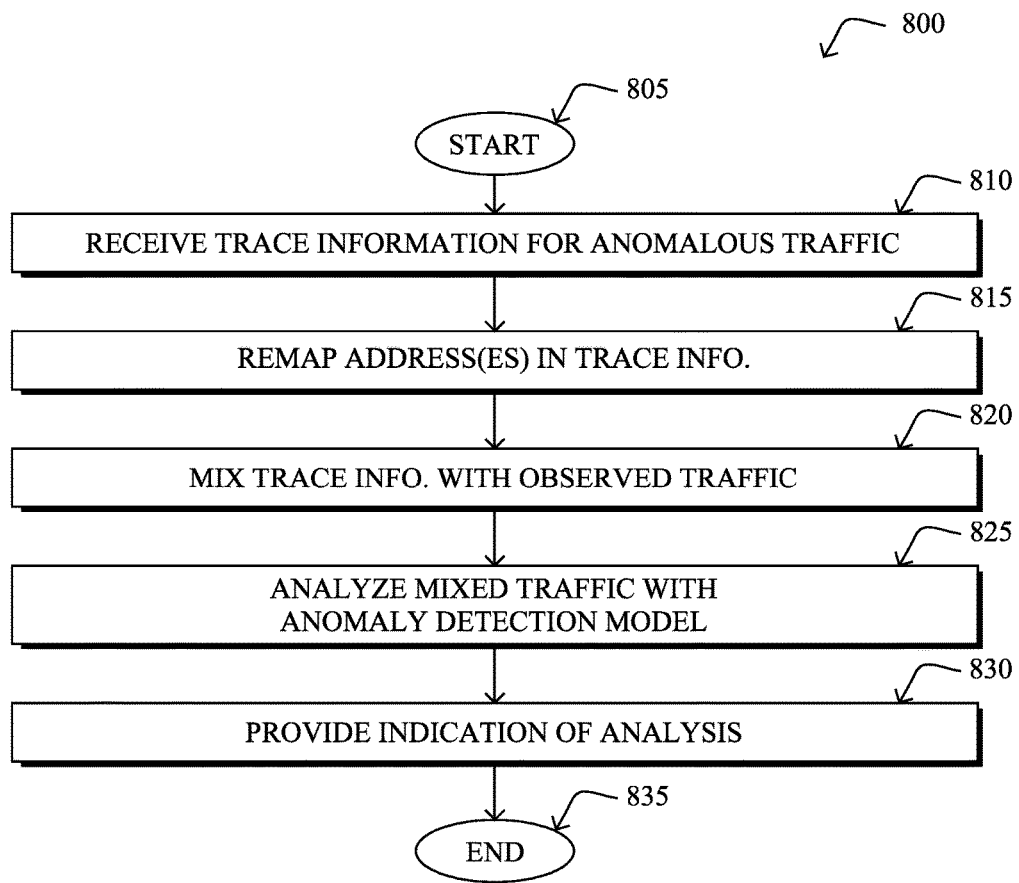
FIG. 8 illustrates an example simplified procedure for analyzing mixed traffic information.

FIG. 8 illustrates an example simplified procedure for analyzing mixed traffic information, in accordance with the various embodiments herein. Generally, procedure 800 may be performed by a specialized device in a network executing specialized machine instructions. For example, a networking device hosting an anomaly detector (e.g., a router, switch, etc.) may perform procedure 800. The procedure 800 may start at step 805 and continues on to step 810 where, as described in greater detail above, the device receives trace information for one or more traffic flows associated with a particular anomaly. For example, a supervisory device in the network may send raw packets, flow level reports, etc., to the device for mixing with observed traffic information. The trace information may also include an indication of the address(es) associated with the anomaly, the roles of the nodes involved in the anomaly, timestamp information for the flows, or any other information that the device can use to simulate the presence of the anomaly in its local network.

At step 815, as detailed above, the device may remap the network addresses in the trace information to addresses of one or more nodes in the network based on roles of the one or more nodes. For example, if the anomaly trace information indicates that a particular address involved in the anomaly is a DNS server, the device may remap the address to that of a DNS server in the local network of the device.

At step 820, the device may mix the trace information with traffic information regarding one or more observed traffic flows in the network, to form a set of mixed traffic information, as described in greater detail above. Notably, the device may use the remapped addresses to intermix the anomaly trace information with traffic information regarding flows actually observed in the local network of the device. In other words, the device may simulate the presence of the anomaly in the local network as input to one or more anomaly detectors hosted by the device.

At step 825, as detailed above, the device may analyze the mixed traffic information using an anomaly detection model. For example, the device may assess the mixed traffic information that includes the anomaly trace information, to see if the model is able to detect the anomaly.

At step 830, the device may provide an indication of a result of the analysis by the model to the supervisory device, as described in greater detail above. For example, the device may raise an anomaly alert for the anomaly, if the model is able to correctly detect the anomaly. In another example, if the device does not detect the anomaly, the indication may comprise only a notification that the device is going to simulate the anomaly without a corresponding anomaly detection alert. Procedure 800 then ends at step 835.

Figure 9:
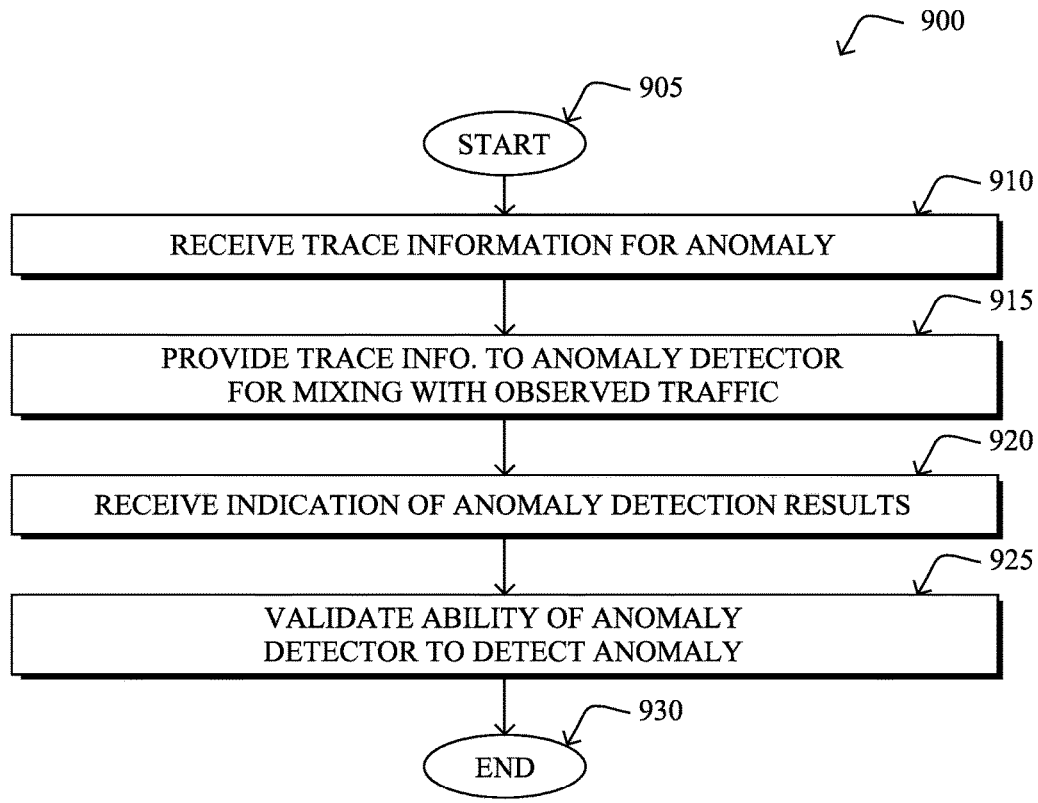
FIG. 9 illustrates an example simplified procedure for validating an anomaly detection model hosted by a device.

FIG. 9 illustrates an example simplified procedure for validating an anomaly detection model hosted by a device, in accordance with various embodiments herein. Generally, a specialized supervisory device in a network may execute procedure 900, such as an SCA in a distributed SLN. Procedure 900 may begin at step 905 and continues on to step 910 where, as described in greater detail above, the supervisory device may receive trace information for one or more traffic flows associated with a known anomaly. In turn, the supervisory device may store the trace information in a local database. In various cases, the supervisory device may receive the trace information from a user interface or one or more other devices in the network also configured to detect attacks or other anomalies (e.g., a firewall, etc.).

At step 915, as detailed above, the supervisory device may provide the trace information to another device in the network that hosts an anomaly detection model. In particular, the trace information may prompt the receiving device to mix the trace information with other traffic information observed in the local network of the other device. In some embodiments, the provided trace information may also include the addresses of the nodes associated with the anomaly, role information for the nodes, traffic flow timestamps, or the like.

At step 920, the supervisory device may receive an indication of the anomaly detection results performed by the other device, as described in greater detail above. Notably, the other device may use the mixed traffic information as input to its hosted anomaly detection model. In some cases, the indication may comprise an anomaly detection alert from the other device that includes an indication that the reported anomaly is the same anomaly under test. In other cases, the indication may comprise simply an indication that the other device is performing the test, without a corresponding anomaly detection alert, thereby indicating that the model has failed the test. In further embodiments, the indication may be an explicit message sent to the supervisory device from the device hosting the anomaly detection model.

At step 925, as detailed above, the supervisory device may validate the ability of the anomaly detection model to detect the anomaly associated with the provided anomaly trace information. In particular, the supervisory device may assess the results of the model analyzing the mixed traffic information, to determine whether the model has failed to detect the anomaly. In turn, of the model does not produce satisfactory results, the supervisory device may take any number of corrective measures, such as alerting a user, initiating retraining or updating of the model, employing a different detection strategy on the other device to detect the particular anomaly, etc. Procedure 900 then ends at step 930.

It should be noted that while certain steps within procedures 800-900 may be optional as described above, the steps shown in FIGS. 8-9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800-900 are described separately, certain steps from each procedure may be incorporated into each other procedure, and the procedures are not meant to be mutually exclusive.

The techniques described herein, therefore, perform sanity checks of potential anomalies learned over time by an anomaly detection model. Such an approach ensures that the accidental learning of anomalous behavior does not prevent the system from recognizing important and malicious behaviors. In particular, the techniques herein address a potential flow of unsupervised anomaly detection systems, which is to ensure that their initial training set did not contain samples of known attacks (thus biasing the detector and preventing any further detection of such attacks, or similar attacks). The techniques herein also present a new approach based on on-the-fly mixing of traffic records coming from the network and an attack, allowing the system to "test" the detection capability of the detectors. Further, the techniques herein provide coordination for a distributed detection system, where a centralized element communicates with distributed agents at the edge, to perform the sanity checks.

While there have been shown and described illustrative embodiments that provide for performing sanity checks of potential learned anomalies, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a device in a network and from a supervisory device, trace information for one or more traffic flows associated with a particular anomaly;
   remapping, by the device, network addresses in the trace information to addresses of one or more nodes in the network based on roles of the one or more nodes;
   mixing, by the device and using the remapped network addresses, the trace information for the one or more traffic flows associated with the particular anomaly with traffic information regarding one or more observed traffic flows in the network, to form a set of mixed traffic information;
   analyzing, by the device, the mixed traffic information using an anomaly detection model; and
   providing, by the device, an indication of a result of the analysis of the mixed traffic information to the supervisory device.

2. The method as in claim 1, further comprising:
   disabling, by the device, updates to the anomaly detection model during the analysis of the mixed traffic information.

3. The method as in claim 1, wherein remapping the network addresses in the trace information further comprises:
   adjusting, by the device, one or more timestamps in the trace information that are associated with the one or more traffic flows associated with the particular anomaly.

4. The method as in claim 1, further comprising:
   sending, by the device, a notification to the supervisory device regarding the mixed traffic information, wherein the supervisory device uses the notification to validate whether the anomaly detection model on the device was able to detect the particular anomaly.

5. The method as in claim 4, wherein the notification indicates the remapped network addresses and a start time for the mixing of the trace information with the traffic information regarding the one or more observed traffic flows.

6. The method as in claim 1, further comprising:
   sending, by the device, an error notification to the supervisory device, in response to being unable to remap a particular network address in the received trace information.

7. The method as in claim 1, further comprising:
   receiving, at the device and from the supervisory device, a model update request for the anomaly detection model, based on the result of the analysis of the mixed traffic information; and
   updating, by the device, the anomaly detection model, in response to the model update request.

8. A method, comprising:
   receiving, at a supervisory device in a network, trace information for one or more traffic flows associated with an anomaly;
   providing, by the supervisory device and to a device hosting an anomaly detection model, the trace information for mixing with traffic information regarding one or more traffic flows observed by the device hosting the anomaly detection model;
   receiving, at the supervisory device, an indication of a result of the anomaly detection model analyzing mixed traffic information, wherein the mixed traffic information comprises the trace information for the one or more traffic flows associated with the particular anomaly and the traffic information regarding the one or more traffic flows observed by the device hosting the model; and
   validating, by the supervisory device, whether the anomaly detection model was able to detect the anomaly based on the result of the anomaly detection model analyzing the mixed traffic information.

9. The method as in claim 8, further comprising:
   including, by the supervisory device, an indication in the provided trace information of one or more roles of nodes associated with the one or more traffic flows associated with the anomaly.

10. The method as in claim 8, further comprising:
    sending, by the device, a notification to a user interface indicating whether the anomaly detection model was able to detect the anomaly.

11. The method as in claim 8, further comprising:
    determining, by the supervisory device, that the anomaly detection model was not able to detect the anomaly; and, in response,
    sending, by the supervisory device, a model update request to the device hosting the anomaly detection model.

12. The method as in claim 11, wherein determining that the anomaly detection model was not able to detect the anomaly comprises:
    receiving, at the supervisory device, a start time for the mixing of the trace data by the device hosting the anomaly detection model; and
    determining, by the supervisory device, that the supervisory device did not receive an anomaly notification for the anomaly within a predefined timespan after the start time for the mixing of the trace data.

13. The method as in claim 8, further comprising:
    receiving, at the supervisory device, an error notification that the device hosting the anomaly detection model was unable to unable to remap a particular network address in the received trace information to a local network address.

14. An apparatus, comprising:
    one or more network interfaces to communicate with a network;
    a processor coupled to the network interfaces and configured to execute one or more processes; and
    a memory configured to store a process executable by the processor, the process when executed operable to:
    receive, from a supervisory device, trace information for one or more traffic flows associated with a particular anomaly;
    remap network addresses in the trace information to addresses of one or more nodes in the network based on roles of the one or more nodes;
    mix, using the remapped network addresses, the trace information for the one or more traffic flows associated with the particular anomaly with traffic information regarding one or more observed traffic flows in the network, to form a set of mixed traffic information;
    analyze the mixed traffic information using an anomaly detection model; and
    provide an indication of a result of the analysis of the mixed traffic information to the supervisory device.

15. The apparatus as in claim 14, wherein the process when executed is further operable to:
    disable updates to the anomaly detection model during the analysis of the mixed traffic information.

16. The apparatus as in claim 14, wherein the apparatus remaps the network addresses in the trace information by:
adjusting one or more timestamps in the trace information that are associated with the one or more traffic flows associated with the particular anomaly.

17. The apparatus as in claim 14, wherein the process when executed is further operable to:
send a notification to the supervisory device regarding the mixed traffic information, wherein the supervisory device uses the notification to validate whether the anomaly detection model on the device was able to detect the particular anomaly.

18. The apparatus as in claim 17, wherein the notification indicates the remapped network addresses and a start time for the mixing of the trace information with the traffic information regarding the one or more observed traffic flows.

19. The apparatus as in claim 14, wherein the process when executed is further operable to:
send an error notification to the supervisory device, in response to being unable to remap a particular network address in the received trace information.

20. The apparatus as in claim 14, wherein the process when executed is further operable to:
receive, from the supervisory device, a model update request for the anomaly detection model, based on the result of the analysis of the mixed traffic information; and
update the anomaly detection model in response to the model update request.

\* \* \* \* \*